US008027541B2

(12) United States Patent
Hua et al.

(10) Patent No.: US 8,027,541 B2
(45) Date of Patent: Sep. 27, 2011

(54) IMAGE ORGANIZATION BASED ON IMAGE CONTENT

(75) Inventors: Gang Hua, Redmond, WA (US); Steven M. Drucker, Bellevue, WA (US); Michael Revow, Bellevue, WA (US); Paul A. Viola, Seattle, WA (US); Richard Zemel, Toronto (CA)

(73) Assignee: Microsoft Corporation, Redmond, WA (US)

( * ) Notice: Subject to any disclaimer, the term of this patent is extended or adjusted under 35 U.S.C. 154(b) by 1031 days.

(21) Appl. No.: 11/725,129

(22) Filed: Mar. 15, 2007

(65) Prior Publication Data

US 2008/0226174 A1    Sep. 18, 2008

(51) Int. Cl.
*G06K 9/46* (2006.01)
(52) U.S. Cl. .......................... 382/190; 382/118
(58) Field of Classification Search .................. None
See application file for complete search history.

(56) References Cited

U.S. PATENT DOCUMENTS

| | | | |
|---|---|---|---|
| 6,216,138 B1 * | 4/2001 | Wells et al. | 715/202 |
| 6,501,857 B1 | 12/2002 | Gotsman | |
| 6,636,648 B2 * | 10/2003 | Loui et al. | 382/284 |
| 7,010,751 B2 | 3/2006 | Shneiderman | |
| 7,035,467 B2 | 4/2006 | Nicponski | |
| 7,697,735 B2 * | 4/2010 | Adam et al. | 382/118 |
| 2002/0107829 A1 | 8/2002 | Sigurjonsson et al. | |
| 2003/0033296 A1 | 2/2003 | Rothmuller et al. | |
| 2003/0076322 A1 | 4/2003 | Ouzts et al. | |
| 2003/0108244 A1 * | 6/2003 | Li et al. | 382/227 |
| 2003/0128877 A1 * | 7/2003 | Nicponski | 382/224 |
| 2004/0197013 A1 * | 10/2004 | Kamei | 382/118 |
| 2004/0264780 A1 | 12/2004 | Zhang et al. | |
| 2005/0105803 A1 | 5/2005 | Ray | |
| 2006/0078201 A1 | 4/2006 | Kim et al. | |
| 2006/0251292 A1 | 11/2006 | Gokturk et al. | |

OTHER PUBLICATIONS

"Organise-Picasa Instantly Locates and Organises all the Pictures on Your Computer", http://picasa.google.com/features/index.html.
Allan, et al., "FotoFile: A Consumer Multimedia Organization and Retrieval System", Date: pp. 496-503, p. 1999, http://delivery.acm.org/10.1145/310000/303143/p496-kuchinsky.pdf?key1=303143&key2=5852451711&coll=GUIDE&dl=GUIDE&CFID=14440903&CFTOKEN=55878062.
Girgensohn, et al., "Organizing Photos of People", Date: Oct. 24-27, 2004, http://www.fxpal.com/publications/FXPAL-PR-04-287.pdf.

* cited by examiner

*Primary Examiner* — Daniel Mariam
*Assistant Examiner* — Elisa Rice (57) ABSTRACT

A system for organizing images includes an extraction component that extracts visual information (e.g., faces, scenes, etc.) from the images. The extracted visual information is provided to a comparison component which computes similarity confidence data between the extracted visual information. The similarity confidence data is an indication of the likelihood that items of extracted visual information are similar. The comparison component then generates a visual distribution of the extracted visual information based upon the similarity confidence data. The visual distribution can include groupings of the extracted visual information based on computed similarity confidence data. For example, the visual distribution can be a two-dimensional layout of faces organized based on the computed similarity confidence data—with faces in closer proximity faces computed to have a greater probability of representing the same person. The visual distribution can then be utilized by a user to sort, organize and/or tag images.

20 Claims, 12 Drawing Sheets

*FIG. 1*

|  | FACE$_1$ | FACE$_2$ | ● ● ● | FACE$_N$ |
|---|---|---|---|---|
| FACE$_1$ | 0 | 0.50 |  | 0.99 |
| FACE$_2$ | 0.50 | 0 |  | 0.75 |
| ● ● ● |  |  |  |  |
| FACE$_N$ | 0.99 | 0.75 |  | 0 |

IMAGE ORGANIZATION BASED ON IMAGE CONTENT

BACKGROUND

Digital cameras provide a relatively inexpensive means to record digital images. Quite frequently, digital camera users capture a greater quantity of digital images than the users would have with a traditional film camera. The availability of computer storage, for example, on local hard drives, removable memory storage devices and Internet web servers has dramatically increased the amount of digital images that users store. As such, users can be inundated with unorganized volumes of digital images.

The stored digital images can have non-descriptive files names such as "IMAGE0001". Oftentimes, users are unfamiliar with the procedure for setting and associating a date and/or timestamp with the digital image. Users can be confronted with literally thousands of digital images to review in order to locate a particular digital image. Thus, the inability to easily retrieve a particular digital image can be frustrating for the user.

Conventional digital image organization systems have allowed users to manually tag digital images with descriptive metadata. For example, a user can manually create a tag descriptive of an event associated with the digital image (e.g., "John's birthday party") and/or of a subject of the digital image (e.g., "John"). The manual process of reviewing and tagging each digital image with one or more tags can be an arduous task.

SUMMARY

The following presents a simplified summary in order to provide a basic understanding of novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed systems and methods facilitate organization of images by providing a visual distribution of visual information (e.g., faces, scenes, etc.) extracted from the images (e.g., digital photographs). The visual distribution can include groupings of extracted visual information based on computed similarity confidence data. For example, the visual distribution can be a two-dimensional layout of faces organized based on the computed similarity confidence data—with faces in closer proximity computed to have a greater probability of representing the same person. The visual distribution can then be utilized by a user to sort, organize and/or tag images.

A computer-implemented system for organizing images is provided. The system includes an extraction component that extracts visual information (e.g., faces, scenes, etc.) from the images. The system further includes a comparison component for computing similarity confidence data between the extracted visual information. The comparison component further generates a visual distribution (e.g., two-dimensional layout) of the extracted visual information based, at least in part, upon the similarity confidence data.

The system can, optionally, include a user interface component for displaying the visual distribution to a user. The user interface component can also receive user input for altering the visual distribution and/or providing tag information. The user interface component can thus enable users to quickly sort and tag images based on the extracted visual information.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

The disclosed systems and methods facilitate organization of images by providing a visual distribution of visual information (e.g., faces, scenes, etc.) extracted from the images (e.g., digital photographs) to a user. The visual distribution can include groupings of the extracted visual information based on computed similarity confidence data. For example, the visual distribution can be a two-dimensional layout of faces organized based on the computed similarity confidence data—with faces in closer proximity faces computed to have a greater probability of representing the same person.

A user interface component can facilitate a user's refinement of the visual distribution. For example, a user can add and/or delete items from a particular cluster of visual information. Further, a user can tag a particular cluster with the tag propagated to the images from which the visual information was extracted.

DEFINITIONS

The following terms are used throughout the description and drawings, the definitions of which are provided herein to assist in understanding various embodiments. For the convenience, unless otherwise set forth in the text, those terms are defined as follows:

A classifier is a function that maps an input attribute vector, $x=(x1, x2, x3, x4, xn)$, to a class label class(x). The classifier can also output a confidence that the input belongs to a class, that is, $f(x)$=confidence (class(x)). Such classification can employ a probabilistic and/or other statistical analysis (e.g., one factoring into the analysis utilities and costs to maximize the expected value to one or more people) to prognose or infer an action that a user desires to be automatically performed. In the case of image organization systems, for example, the classes are faces of people and/or areas of interest.

As will be readily appreciated from the subject specification, the subject architecture can employ classifiers that are explicitly trained (e.g., via a generic training data) as well as implicitly trained (e.g., via observing user behavior, receiving extrinsic information). For example, classifiers are configured via a learning or training phase within a classifier constructor and feature selection module. Thus, the classifier(s) can be employed to automatically learn and perform a number of functions according to predetermined criteria.

While certain ways of displaying information to users are shown and described with respect to certain figures as exemplary user interfaces, those skilled in the relevant art will recognize that various other alternatives can be employed. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Figure 1:
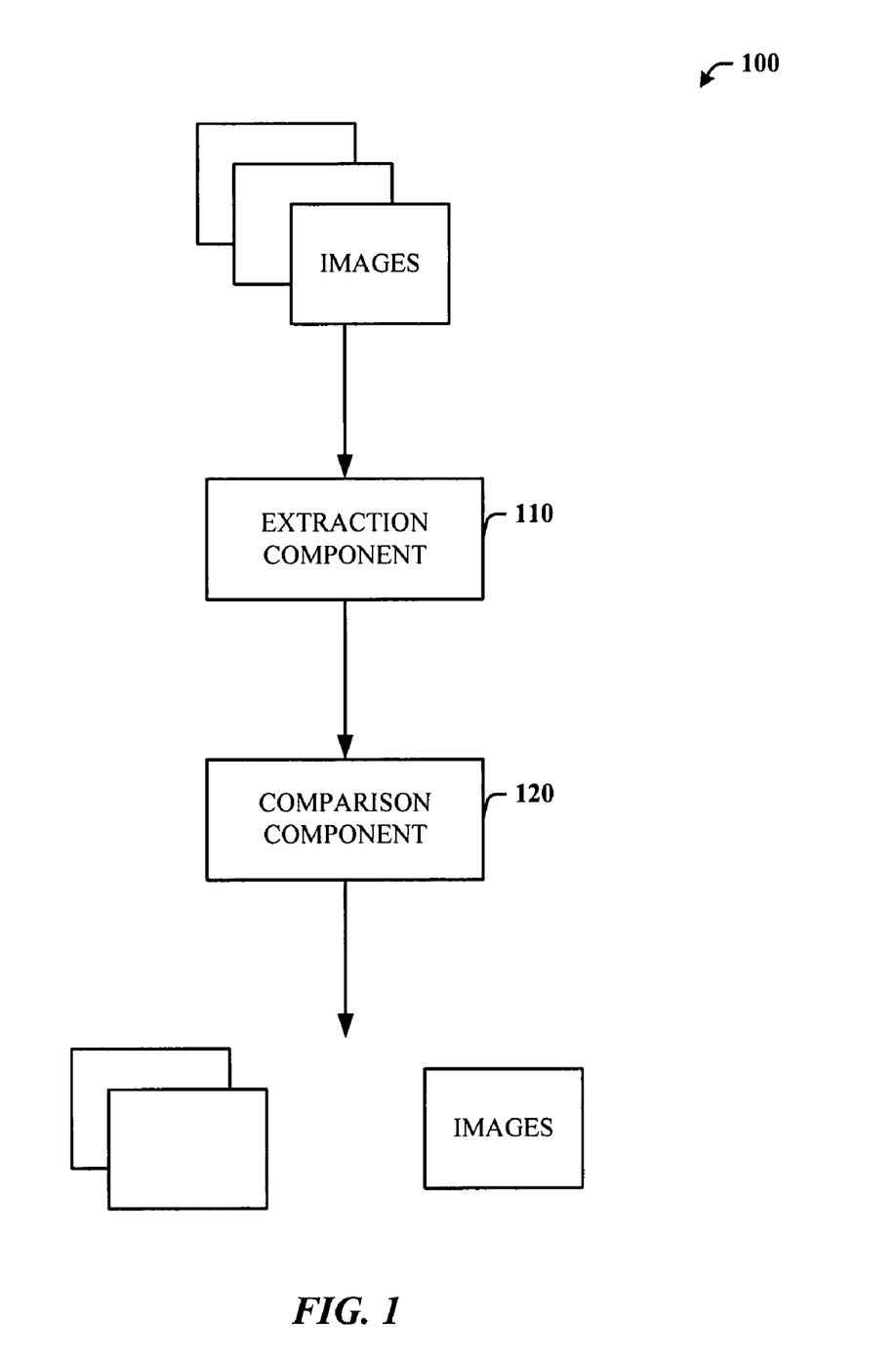
FIG. 1 illustrates a computer-implemented system for organizing images.

Referring initially to the drawings, FIG. 1 illustrates a computer-implemented system 100 for organizing images 100. The system 100 can be employed to facilitate organization of images (e.g., digital photographs) by providing a visual distribution (e.g., two-dimensional layout) of extracted visual information (e.g., faces, scenes, etc.) to a user. The visual distribution can include groupings of extracted visual information based on computed similarity confidence data. The visual distribution can then be utilized by a user to sort and tag images, as described in greater detail below.

The system 100 includes an extraction component 110 that extracts visual information from the images. The type of visual information extracted from the images can be pre-configured and/or based upon user input (e.g., organize based on faces, organize based on scenes, etc.). The extraction component 110 provides the extracted visual information to a comparison component 120.

In one embodiment, the extraction component 110 employs a face detection framework that identifies discriminative features to extract face(s) from the images. The face detection framework is based a sequence of increasingly more complex classifiers collectively referred to as a cascade detector.

In a cascade detector, an input window is evaluated on a first classifier of the cascade and if that classifier returns false then computation on that window ends and the detector returns false (e.g., the input window is identified as not including a face). If the classifier returns true then the window is passed to the next classifier in the cascade and so on through the classifiers of the cascade or until a particular classifier returns false. In this manner, for an input window which passes through the final classifier, the detector returns true, that is, the input window is identified as including a face. The extraction component 110 then provides visual information associated with the input window identified as including a face to the comparison component 120.

In one embodiment, in addition to employing a cascade detector to extract face(s) from images, the extraction component 110 employs a multiple instance pruning (MIP) algorithm for training of the cascade detector. In this embodiment, the cascade detector comprises "soft cascade" which refers to relaxation of the cascade structure of distinct and separate stages so that earlier computation of weak classifier scores can be combined with later weak classifiers.

During training of the cascade detector, the MIP algorithm computes a set of thresholds which aggressively terminate computation with no reduction in detection rate or increase in false positive rate. The MIP algorithm is based on the premise that examples that are destined to be rejected by the complete classifier can be safely pruned early. Thus, intermediate thresholds can be adjusted such that the associated classifiers return false precisely on those positive examples which are discarded by the complete cascade detector.

It can be difficult to define a correct position and scale of a face in an image. The detection process scans the image generating a large, but finite collection of overlapping windows at various scales and locations. Using typical scanning parameters, this can lead to multiple windows which are all equally valid positive detections (ground-truth faces). "Acceptable detection windows" can be employed by the MIP algorithm in order to adjust intermediate thresholds.

A multiple instance learning (MIL) framework has previously been proposed in which positive examples are collected into "bags". The learning algorithm is then given the freedom to select at least one, and perhaps more examples, in each bag as the true positive examples.

Given that there are a set of acceptable windows for each "ground-truth" face in an image, it is possible to set a more aggressive threshold:

$$\theta(t) = \min_{i \in P} \left[ \max_{\{k | k \in F_i / R_i, y_k = 1\}} s_k(t) \right] \quad \text{Eq. 1}$$

where θ(t) is the threshold, i is the index of ground-truth faces; $F_i$ is the set of acceptable windows associated with ground-truth face I and $R_i$ is the set of windows which are retained. P is the set of ground-truth faces that have at least one acceptable window above the final threshold:

$$P = \left\{ i \middle| \max_{\{k | k \in F_i\}} s_k(T) > \theta(T) \right\} \quad \text{Eq. 2}$$

The positive examples come in bags, only one of which need be classified positive in order to ensure that each face is successfully detected. This new criteria for success is more flexible and therefore more aggressive, and, can be referred to as multiple instance pruning.

It is to be appreciated that any suitable extraction algorithm for extracting visual information from images can be employed by the extraction component 110 and all such extraction algorithms are intended to fall within the scope of the hereto appended claims. For example, a scale invariant features transform (SIFT) matching process can be employed to determine that two image are relatively close likeness.

In another example, given a set of image classifiers (e.g., inside, outside, portrait, landscape, group shot, cityscape, etc.) a distance can be computed between two images as the probability that the images have different tags (e.g., the images are likely to be close since the images have the same tags). Accordingly, the disclosed image organization architecture now includes the capability to be used to tag and organize images very rapidly.

The system 100 further includes the comparison component 120 for computing similarity confidence data between the extracted visual information. The similarity confidence data is an indication of the likelihood that extracted visual information (e.g., faces) of two images are of the subject object (e.g., person)

In one embodiment, the comparison component 120 employs a face recognition algorithm which uses discriminatively trained orthogonal rank one tensor projections. In this manner, images are treated as tensors, rather than the more conventional vector of pixels. Projections are pursued sequentially and take the form of a rank one tensor (e.g., a tensor which is the outer product of a set of vectors). Thereafter, the comparison component 120 iteratively solves an eigenvalue problem with orthogonality constraints on one dimension, and solves unconstrained eigenvalue problems on the other dimensions.

It is to be appreciated that any suitable comparison algorithm for comparing visual information from images can be employed by the comparison component 120 and all such comparison algorithms are intended to fall within the scope of the hereto appended claims.

Using a suitable comparison algorithm, each item of extracted visual information received from the extraction component 110 is compared by the comparison component 120 to the other extracted visual information and the computed confidence data is stored to form a distance matrix. In the distance matrix, the distance between pairs of extracted visual information is related such that different representations of the same object are assigned a small distance. Each entry in the distance matrix is the similarity confidence data that two images are of the same object.

Figure 2:
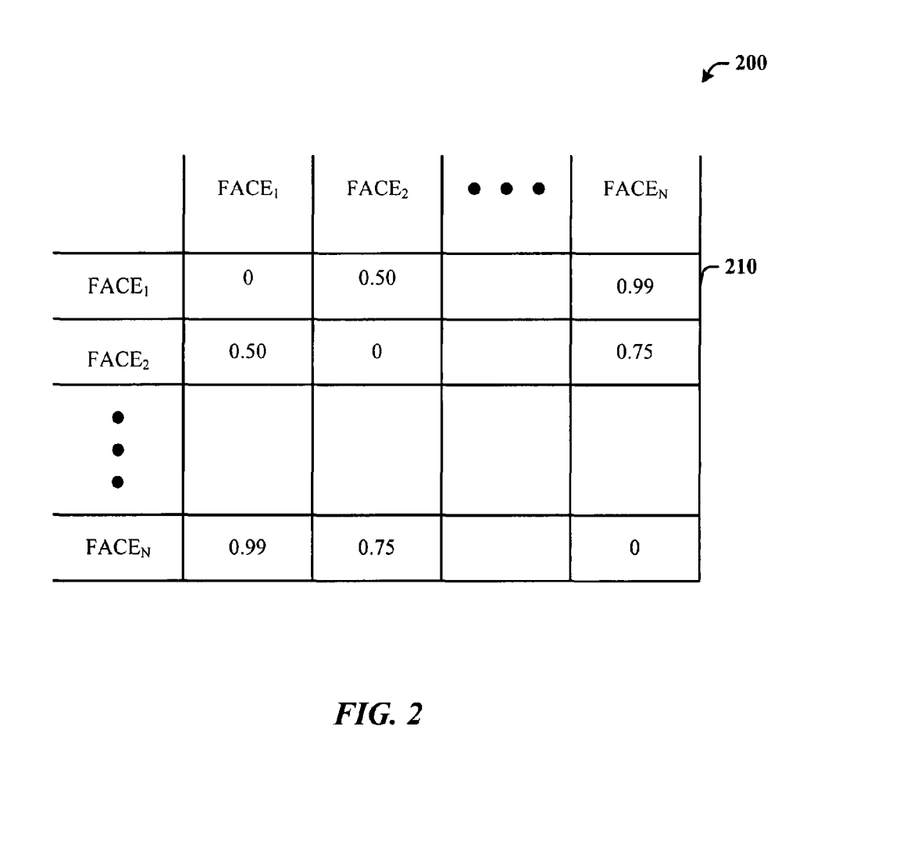
FIG. 2 illustrates an exemplary distance matrix.

Briefly referring to FIG. 2, an exemplary distance matrix 200 is illustrated. In this example, a lower similarity confidence entry 210 is indicative of a greater probability that the two faces are of the same person. The likelihood of Face$_1$ and Face$_1$ (e.g., the same extracted visual information) is assigned a similarity confidence entry 210 of zero as the probability is one hundred percent.

Referring back to FIG. 1, the comparison component 120 then generates a visual distribution (e.g., two-dimensional layout) of the extracted visual information based, at least in part, upon the computed similarity confidence data (e.g., distance matrix).

In one embodiment, the comparison component 120 employs multi-dimensional scaling (MDS) to map each item of extracted visual information into a visual distribution. The visual distribution is a two-dimensional layout that approximates the complex matrix of computed distances based on MDS. MDS is a well-known branch of statistics that deals with embedding objects in a relatively low-dimensional Euclidean space based on a matrix of similarities. More specifically, MDS algorithms typically take a matrix of dissimilarities and find vectors whose inter-vector distances are well-matched to the matrix. Thus, by treating inter-object dissimilarities as distances in high-dimensional space and approximating image dissimilarities in a low dimensional output configuration, relations (e.g., similarities) between images can be preserved. In this embodiment, the two-dimensional layout graphically depicts the comparisons performed by the comparison component 120 and is provided as the visual distribution generated by the comparison component 120.

In another embodiment, the visual distribution is a one-dimensional layout. For example, the distribution can be based on a distance of each of a plurality of images from a selected target image (e.g., rapid sorting within a grid view, discussed in greater detail below).

There are a variety of suitable algorithms employed by the comparison component 120 for generating a visual distribution based upon similarity confidence data (e.g., distance matrix). All such algorithms are intended to fall within the scope of the hereto appended claims.

Figure 3:
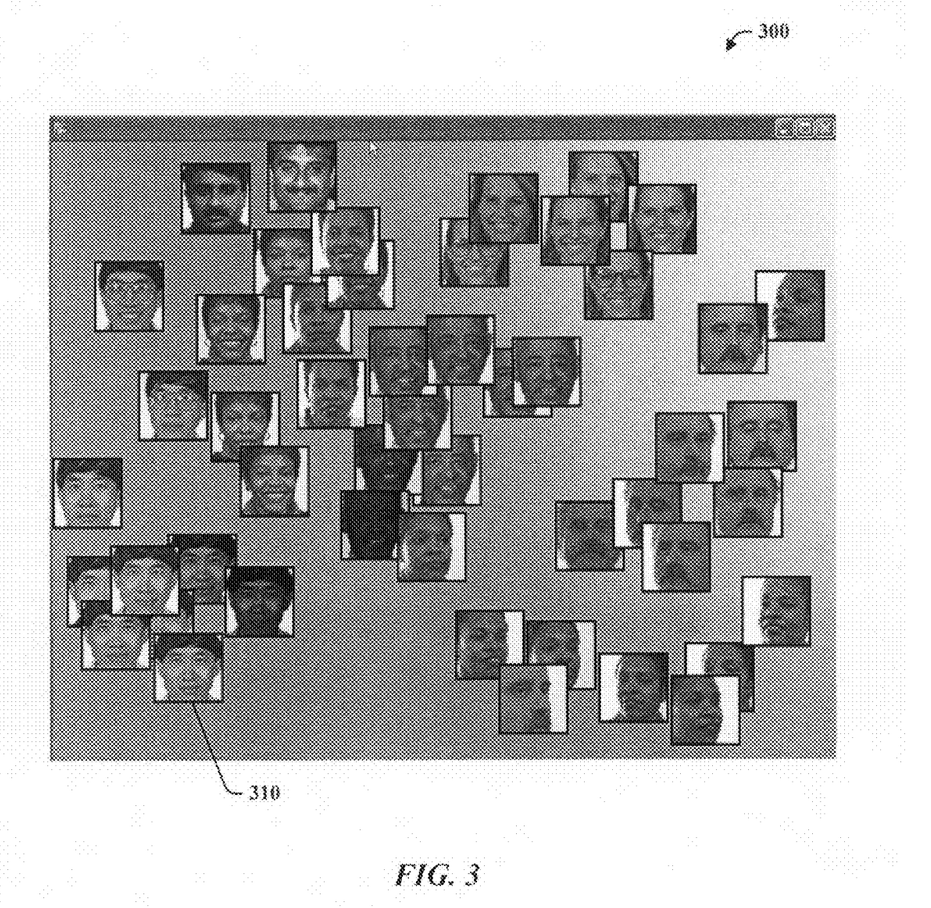
FIG. 3 illustrates an exemplary user interface of a visual distribution.

FIG. 3 illustrates an exemplary user interface 300 depicting a sample visual distribution provided by the system 100. The user interface 300 includes a plurality of faces 310 grouped based on similarity confidence data computed by the comparison component 120. In a more robust implementation, having knowledge of image features (e.g., eye position) allows automatic clustering or grouping where one image partially overlays another image, but will not block a feature (e.g., the eyes) of the underlying image.

Figure 4:
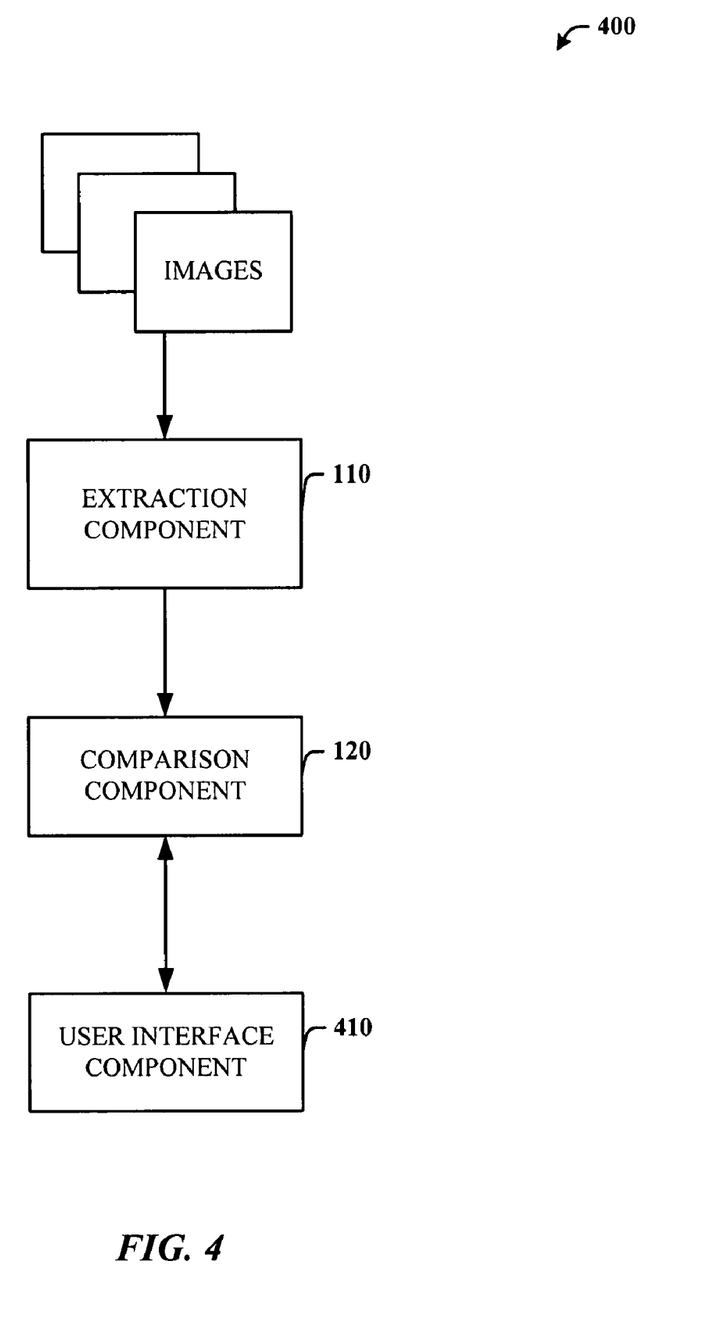
FIG. 4 illustrates a computer-implemented system for organizing images.

As illustrated in FIG. 4, a computer-implemented system 400 can optionally include a user interface component 410 for displaying the visual distribution to a user. The user interface component 410 can further receive user input for altering the visual distribution and/or tag information (e.g., from a computer mouse, pointing device, etc.). The user interface component 410 can thus allow users to quickly sort and tag images based on the extracted visual information (e.g., faces, scenes, etc.).

Figure 5:
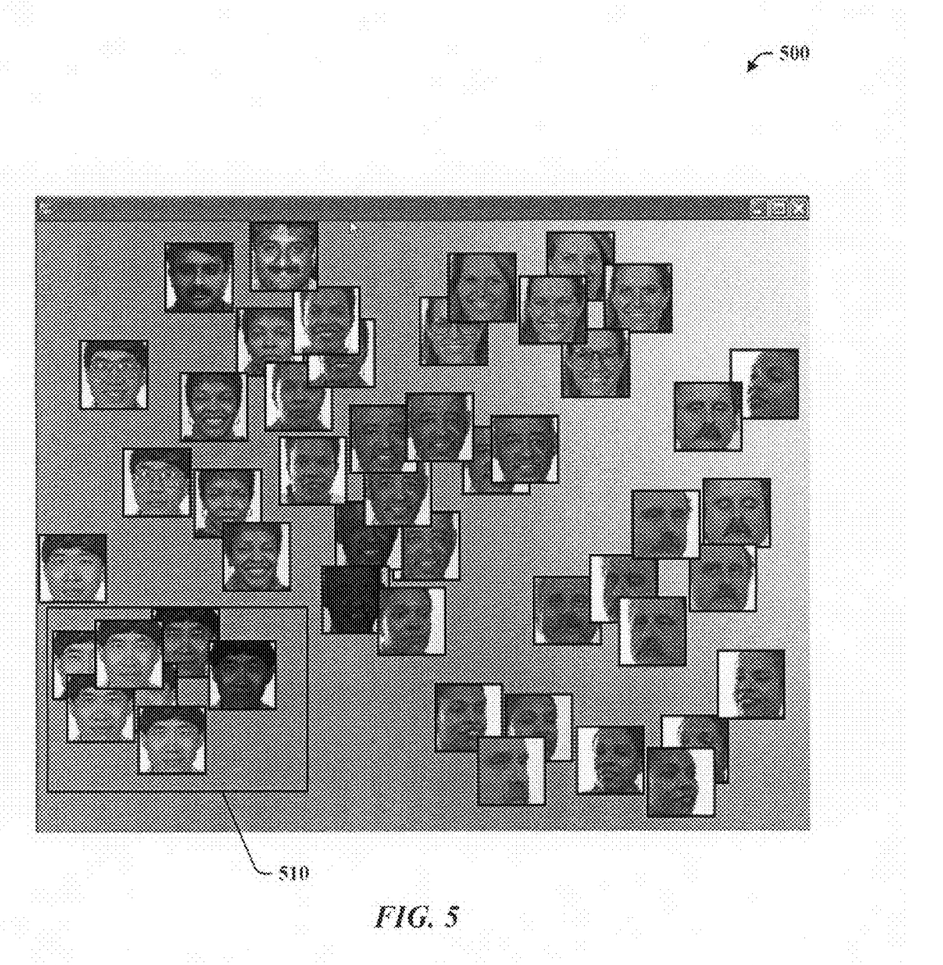
FIG. 5 illustrates an exemplary user interface of a visual distribution and a selection rectangle.

In one embodiment, a user can select multiple instances of extracted visual information (e.g., faces) in one or more ways: click, shift click, control click, rubber band select, expanding rectangle selection and the like. "Expanding rectangle selection" creates a selection rectangle generally centered at the point of a right click and then expands the rectangle on drag. The centered rectangle can be effective on arrangements of extracted visual information on the visual distribution. Referring briefly to FIG. 5, an exemplary user interface 500 is illustrated. In this example, a user has created a selection rectangle 510.

Referring back to FIG. 4, in another embodiment, a user can combine a group of extracted visual information into a layered representation (or a stack). A stack is a logical unit that can be tagged. Creation of a stack can simplify the visual distribution. Thus, a user can refine the visual distribution by dragging and/or grouping the visual information to form distinct stacks, each associated with a particular representation of visual information (e.g., containing a single person).

For example, a stack can be labeled with a name and/or other identifier, for example, "John". The user interface component 410 can then propagate the name and/or other identifier back to a tag associated with the image(s) from which associated visual information was extracted (e.g., original digital photographs). The tag can then be utilized to search, sort and/or retrieve images.

Figure 6:
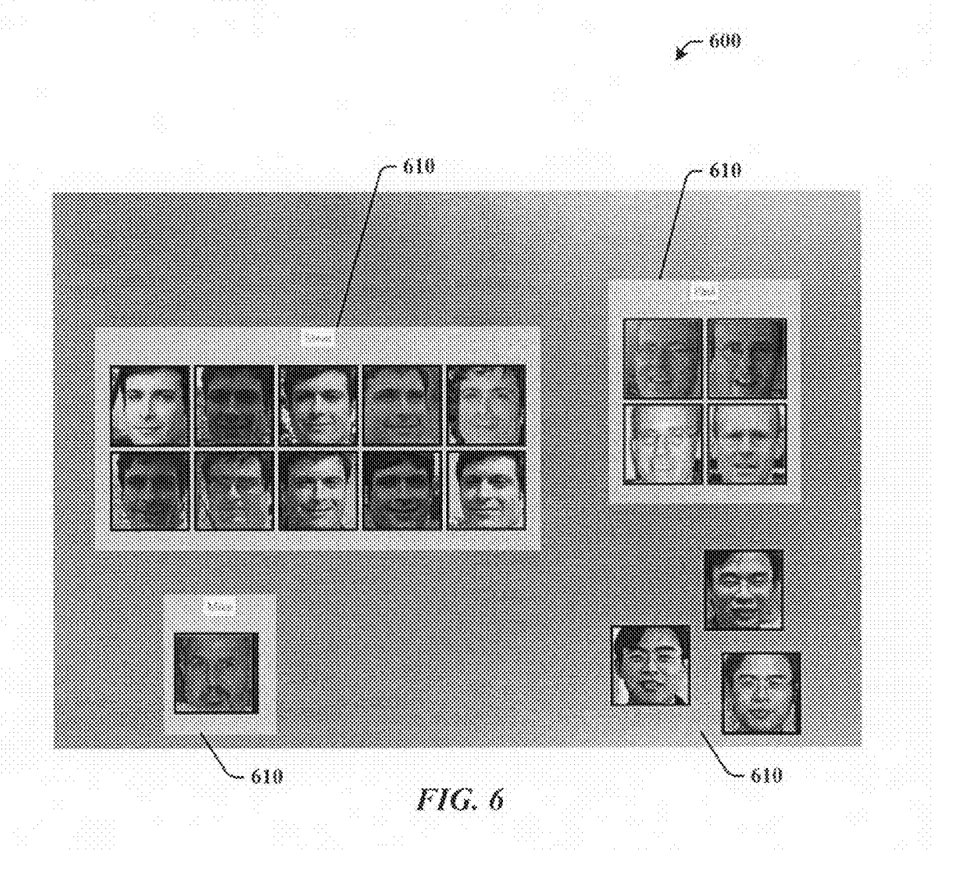
FIG. 6 illustrates an exemplary user interface of a grid view.

In yet another embodiment, stacks (which can contain multiple instances of faces) can be quickly scanned and evaluated by converting to a grid ("lineup mode"), for example, by double-clicking on the stack. As the number of images displayed increases it is possible that a stack can include one or more incorrect items of extracted visual information. Converting to a grid quickly displays the extracted visual information in the stack. Incorrect extracted visual information, if any, can be dragged out of the stack, into another stack, or back onto the visual distribution. Turning briefly to FIG. 6, an exemplary user interface 600 of a grid view is illustrated. The user interface 600 includes groups of extracted visual information in grid view.

Figure 7:
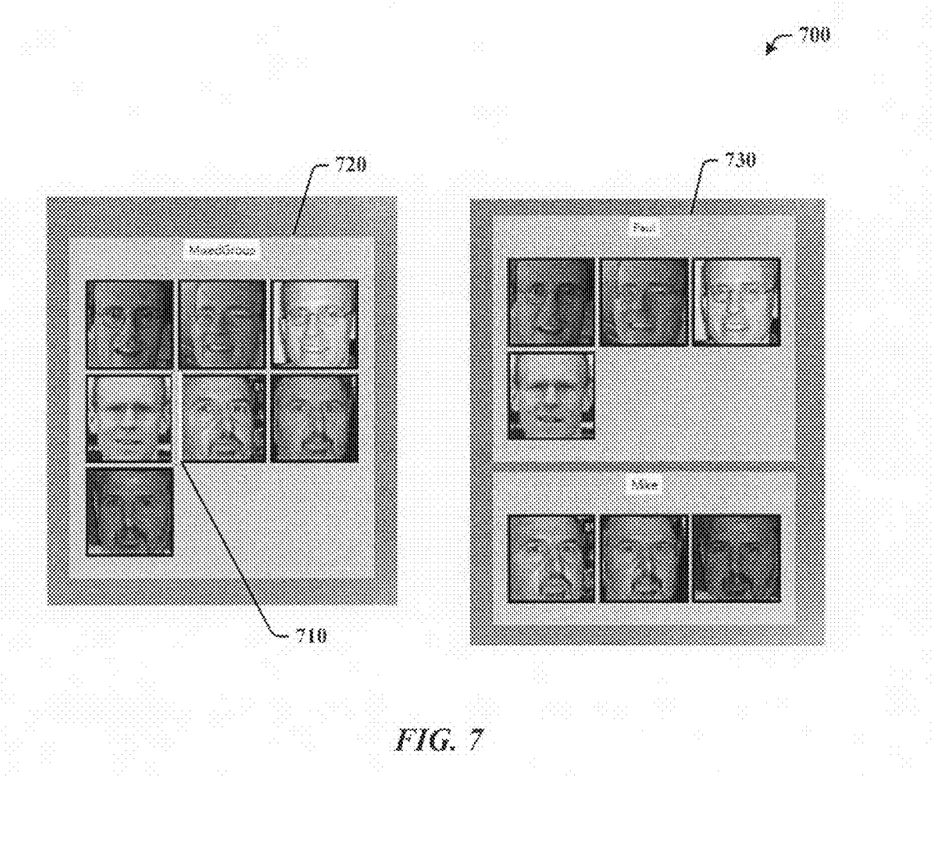
FIG. 7 illustrates an exemplary user interface of a split view.

Next, referring to FIG. 7, an exemplary user interface 700 of a split view is illustrated. In this example, selecting a bar 710 of a first group 720 splits the first group 720 into two groups 730.

Referring back to FIG. 4, extracted visual information can be added to stacks and/or grids by dragging and dropping onto the stack (or grid). As noted previously, a stack can be labeled with a tag. In one example, once labeled, extracted visual information which is added to the stack inherits the tag. Conversely, a corresponding tag is removed from image(s) associated with extracted visual information removed from the stack.

Figure 8:
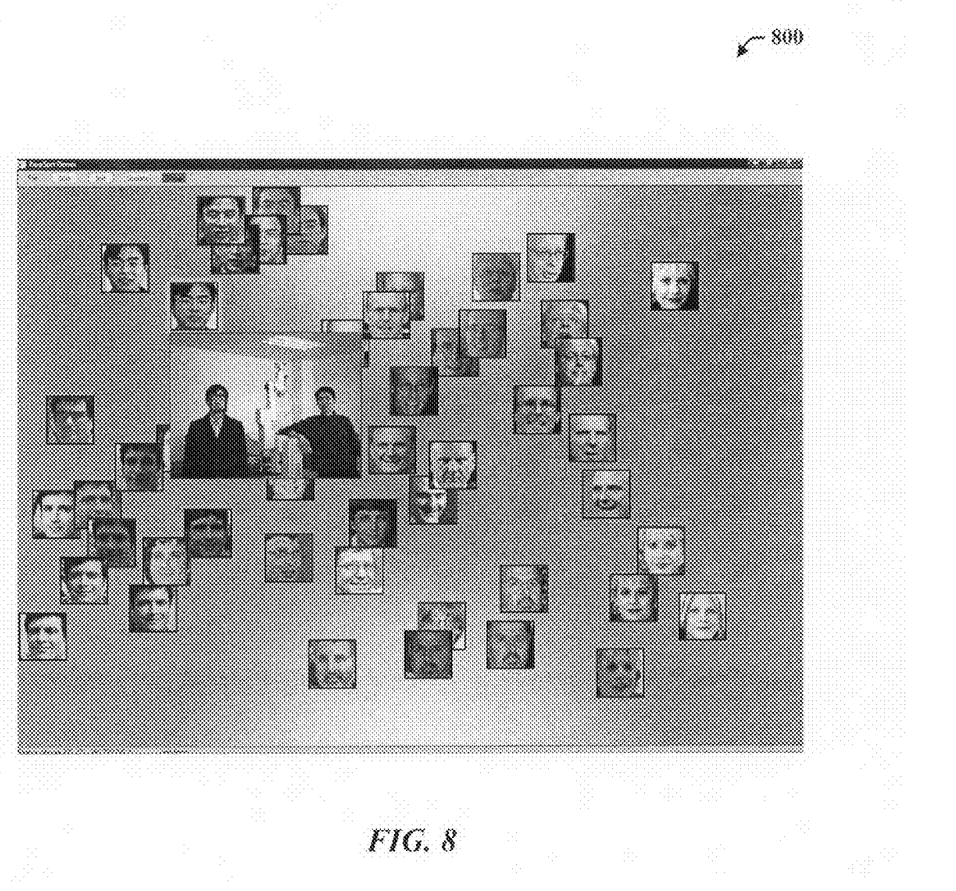
FIG. 8 illustrates an exemplary user interface of a visual distribution and an image displayed in response to a hovering action.

In one embodiment, when a user hovers a pointing entity (e.g., a mouse pointer) over a particular item of extracted visual information, the original image from which the visual information was extracted is displayed. In this manner, a user can more readily identify the visual information with additional context made visible. FIG. 8 illustrates a user interface 800 in which a user has hovered over a face and the corresponding original image is displayed to the user. In the expanded view, the original face of the user can be designated by an artifact (e.g., a rectangle) such that where there are multiple faces in an expanded image, the original face is more easily identifiable. Note that the novel architecture is not limited to faces, in general, but can also be utilized to cluster or group images based on demeanor. For example, images can be clustered according to smiles or scowls, teeth or no teeth showing, glasses or no glasses, hair orientation or no hair, eye color, gender, and so on.

Again referring back to FIG. 4, optionally, the user interface component 410 can provide user feedback to the comparison component 120, which the comparison component 120 can employ to adapt the comparison algorithm. For example, parameter(s) of the comparison algorithm can be modified based on user feedback removing extracted visual information from a particular grouping. With the user feedback, the comparison component 120 can be adapted to better recognize extracted visual information associated with the particular user.

Figure 9:
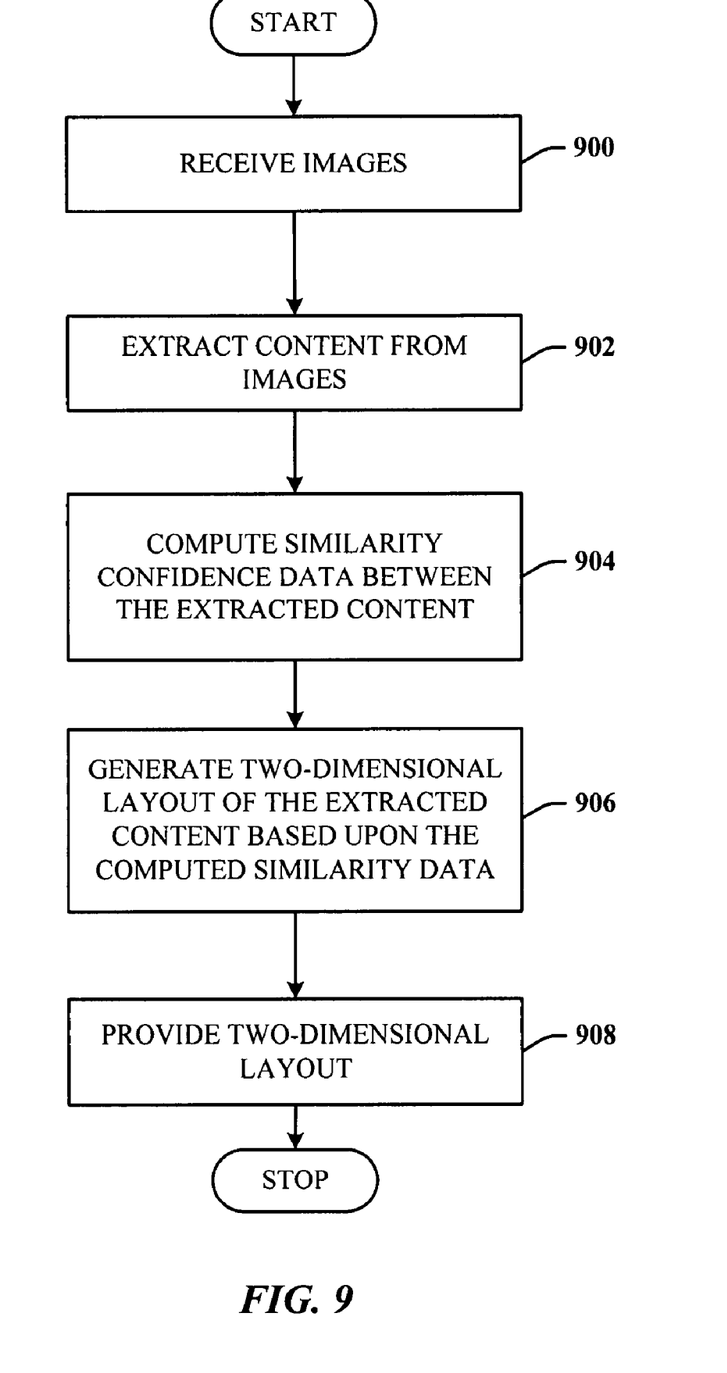
FIG. 9 illustrates a method of organizing images.

FIG. 9 illustrates a method of organizing images. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 900, images are received. For example, a user can submit a collection of digital photographs of family, friends, coworkers, etc., to be organized based on faces in the digital photographs. At 902, content (e.g., faces, scenes, etc.) is extracted from the images. For example, a face detection algorithm (e.g., cascade detection) that identifies discriminative features can be employed to extract face(s) from the images. At 904, similarity confidence data is computed between the extracted content. For example, using a suitable comparison algorithm, each item of extracted content can be compared to the other extracted content in order to compute similarity confidence data. The computed confidence data can be stored to form a distance matrix in which the distance between pairs of extracted content is related such that different representations of the same object are assigned a small distance. Each entry in the distance matrix is the similarity confidence data that two pieces of extracted content are of the same object.

At 906, a two-dimensional layout of the extracted content is generated based on the computed similarity data. In one embodiment, multi-dimensional scaling (MDS) can be employed to map each item of extracted content (e.g., face, scene, etc.) into a two-dimensional layout, as discussed previously. In this embodiment, the two-dimensional layout is a two-dimensional layout graphically depicting the computed similarity confidence data. At 908, the two-dimensional layout is provided.

Figure 10:
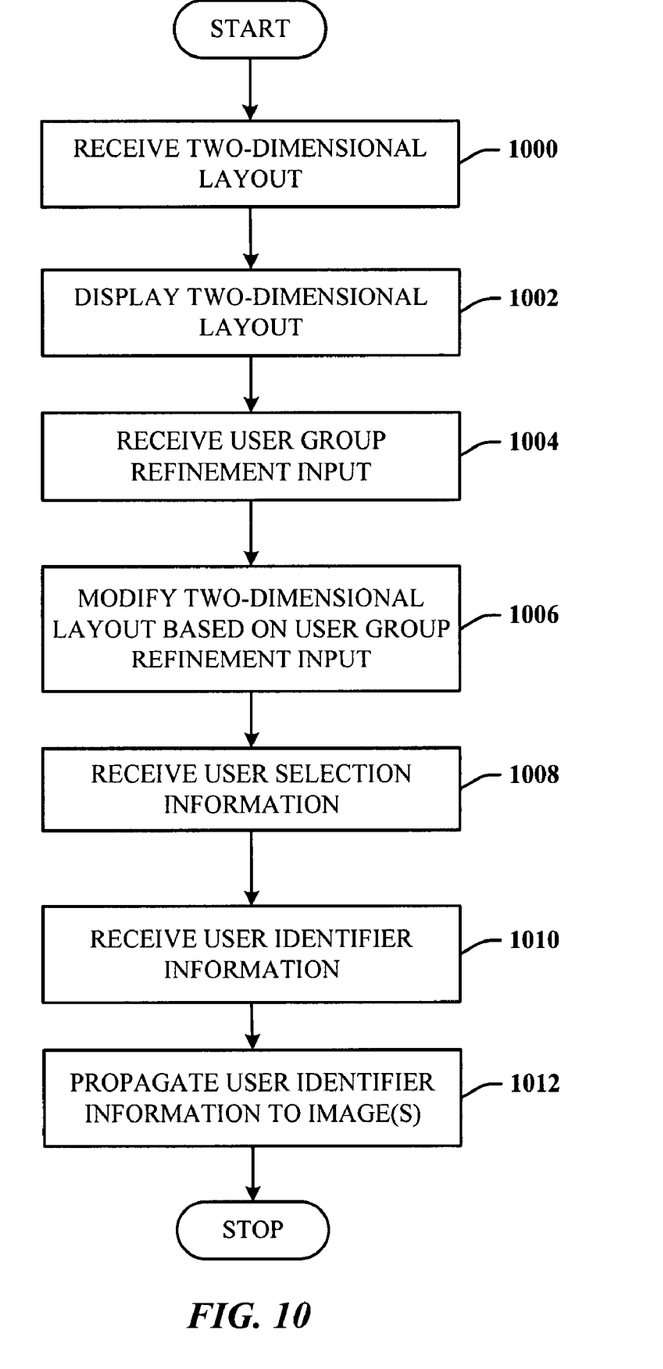
FIG. 10 illustrates a method of organizing images based on user input.

FIG. 10 illustrates a method of organizing images based on user input. At 1000, a two-dimensional layout is received. The two-dimensional layout graphically depicts computed similarity confidence data. At 1002, the two-dimensional layout is displayed, for example, to a user. At 1004, user group refinement input is received. In one embodiment, a user can add and/or delete an item of extracted content from a particular grouping by dragging and dropping the item of extracted content on a display. At 1006, the two-dimensional layout is modified based on the user group refinement input. At 1008, user selection information is received (e.g., click, shift click, control click, rubber band select, expanding rectangle selection, and the like). In one embodiment, a user can create one or more stacks, as discussed above. At 1010, user identifier information is received. In one embodiment, a user can create a label associated with a stack (e.g., name of person whose face is depicted in the extracted content in the stack). At 1012, the user identifier information is propagated to image(s) associated with extracted content selected by the user. For example, the identifier information can be stored as a tag associated with the image(s).

Figure 11:
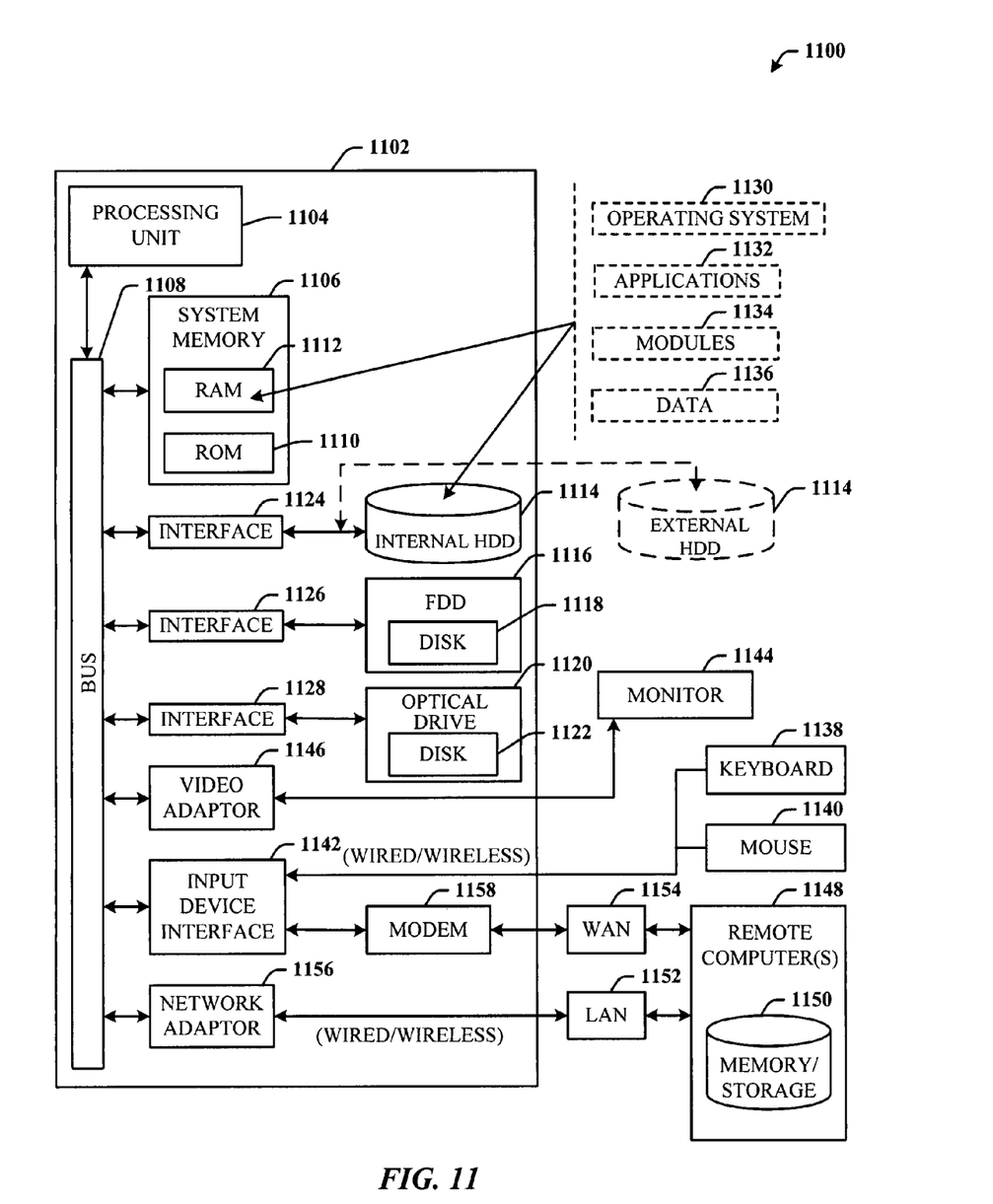
FIG. 11 illustrates a computing system operable to execute the disclosed architecture.

Referring now to FIG. 11, there is illustrated a block diagram of a computing system 1100 operable to execute the disclosed architecture. In order to provide additional context for various aspects thereof, FIG. 11 and the following discussion are intended to provide a brief, general description of a suitable computing system 1100 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 11, the exemplary computing system 1100 for implementing various aspects includes a computer 1102, the computer 1102 including a processing unit 1104, a system memory 1106 and a system bus 1108. The system bus 1108 provides an interface for system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the disclosed architecture can be implemented with various commercially available operating systems or combinations of operating systems.

A user can enter commands and information into the computer 1102 through one or more wired/wireless input devices, for example, a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

Referring briefly to FIGS. 4 and 11, the user interface component 110 can provide information to a user via the monitor 1144 and/or other peripheral output devices. Further, the user interface component 110 can received information from the user via the mouse 1140, the keyboard 1138 and/or other input devices.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, for example, computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3 or Ethernet).

Figure 12:
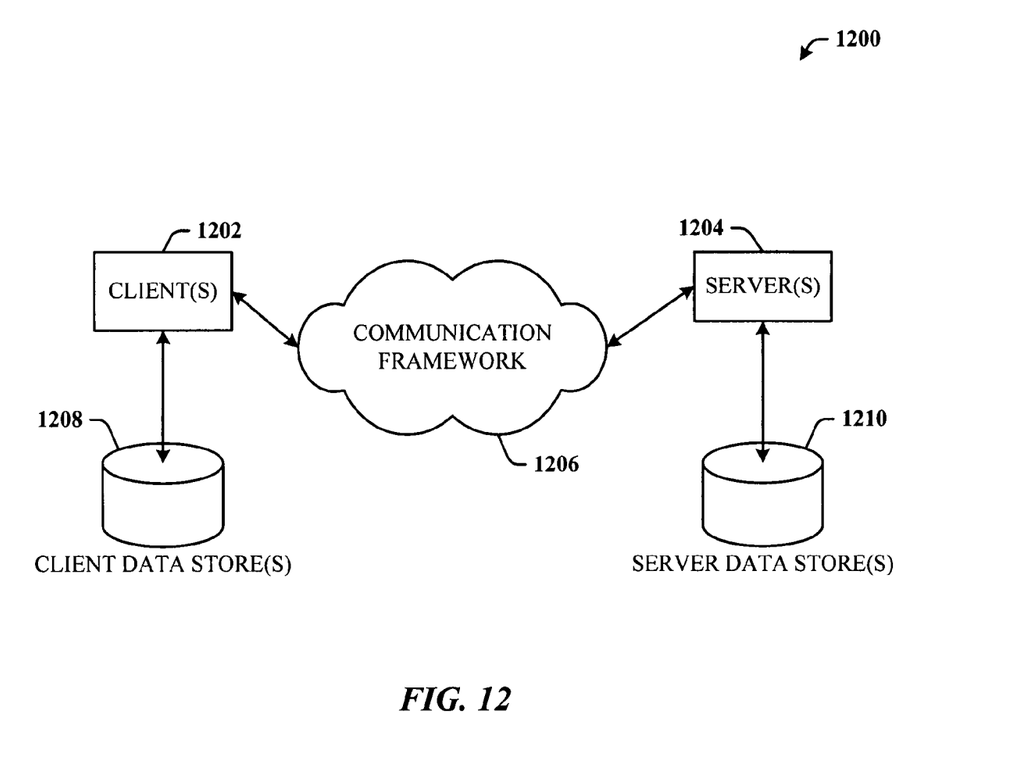
FIG. 12 illustrates an exemplary computing environment.

Referring now to FIG. 12, there is illustrated a schematic block diagram of an exemplary computing environment 1200 that facilitates image organization. The system 1200 includes one or more client(s) 1202. The client(s) 1202 can be hardware and/or software (e.g., threads, processes, computing devices). The client(s) 1202 can house cookie(s) and/or associated contextual information, for example.

The system 1200 also includes one or more server(s) 1204. The server(s) 1204 can also be hardware and/or software (e.g., threads, processes, computing devices). The servers 1204 can house threads to perform transformations by employing the architecture, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system comprising:
a processor for executing computer-executable instructions; and
components for organizing images based on faces of people depicted in the images, the components comprising:
an extraction component including computer-executable instructions for:
detecting the faces of people depicted in the images; and
extracting visual information including the detected faces of the people from the images;
a comparison component including computer-executable instructions for:
computing similarity confidence data by comparing the extracted visual information, the computed similarity confidence data between the extracted visual information indicating a likelihood that the detected faces represent a same person; and
generating a visual distribution of the extracted visual information, the visual distribution including groupings of the extracted visual information based, at least in part, upon the computed similarity confidence data; and
a user interface component including computer-executable instructions for:
displaying the visual distribution as a layout of the faces of the people depicted in the images such that the faces in the layout are displayed in multiple clusters of similar faces based on the groupings of the extracted visual information and such that distances between the faces in the layout are based on the computed similarity confidence data; and
receiving user input to tag the clusters with identifiers for the people depicted in the images, the identifiers of tagged clusters automatically propagating to the images associated with the groupings of the extracted visual information.

2. The system of claim 1, wherein the layout of the faces is a two-dimensional representation of the groupings of the extracted visual information.

3. The system of claim 1, wherein:
the visual information extracted from a particular image comprises extracted visual information for multiple faces; and
identifiers for different tagged clusters are automatically propagated to the particular image.

4. The system of claim 1, wherein the extraction component employs a face detection framework that identifies discriminative features to extract faces from the images.

5. The system of claim 4, wherein the face detection framework is based on a cascade detection algorithm.

6. The system of claim 5, wherein a multiple instance pruning algorithm is employed for training of the cascade detector.

7. The system of claim 1, wherein the images are digital photographs.

8. The system of claim 1, wherein the comparison component comprises a comparison algorithm which is adaptive based on received user feedback.

9. The system of claim 1, wherein the comparison component stores the computed similarity confidence data in a distance matrix.

10. The system of claim 1, wherein the comparison component employs multi-dimensional scaling to map each item of extracted visual information into the visual distribution.

11. The system of claim 1, wherein the comparison component employs a face recognition algorithm which uses discriminatively trained orthogonal rank one tensor projections to compute the similarity confidence data.

12. The system of claim 1, wherein the layout of the faces is a one-dimensional representation of the groupings of the extracted visual information.

13. The system of claim 1, wherein the user interface component includes computer-executable instructions for:
receiving user input to combine faces of a particular cluster into a stack that is identified with a name of a person;
receiving user input to add a face that is not included in the particular cluster to the stack, wherein the name of the person is automatically propagated to the image associated with the extracted visual information which includes the face added to the stack.

14. The system of claim 13, wherein the stack is converted to a grid view in response to user input.

15. The system of claim 1, wherein user input hovering a pointing entity over a particular face displayed in the layout causes the user interface component to display an original image from which the visual information including the particular face was extracted.

16. A computer-implemented method of organizing images based on faces of people depicted in the images, the method, comprising:
detecting, by a processing unit of a computing device, the faces of people depicted in the images;
extracting, by the processing unit, content including the detected faces from the images;
computing, by the processing unit, similarity confidence data by comparing the extracted content, the computed similarity confidence data between the extracted content indicating a likelihood that the detected faces represent a same person; and
generating, by the processing unit, a multi-dimensional distribution of the extracted content, the distribution including groupings of the extracted content based, at least in part, upon the computed similarity data;
displaying, on a display of the computing device, the multi-dimensional distribution as a layout of the faces of the people depicted in the images such that the faces in the layout are displayed in multiple clusters of similar faces based on the groupings of the extracted content and such that distances between the faces in the layout are based on the computed similarity confidence data; and
receiving, by a user input device of the computing device, user input to tag the clusters with identifiers for the people depicted in the images, the identifiers of tagged clusters automatically propagating to the images associated with the groupings of the extracted content.

17. The method of claim 16, wherein:
the content extracted from a particular image comprises extracted content for multiple faces; and
identifiers for different tagged clusters are automatically propagated to the particular image.

18. The method of claim 16, further comprising;
receiving, by the user input device, user input to combine faces of a particular cluster into a stack that is identified with a name of a person;
receiving user input to add a face that is not included in the particular cluster to the stack, the name of the person automatically propagating to an image associated with the extracted content which includes the face added to the stack.

19. The method of claim 18, further comprising:
receiving, by the user input device, user group refinement input to remove a face from the stack, wherein the name of the person is automatically removed from an image associated with the extracted content which includes the face removed from the stack.

20. One or more computer storage media storing computer-executable instructions that, when executed by a processor of a computing device, cause the computing device to perform a method for organizing images based on faces of people depicted in the images, the method comprising:
detecting the faces of people depicted in the images;
extracting content including the detected faces from the images;
computing similarity confidence data by comparing the extracted content, the computed similarity confidence data between the extracted content indicating a likelihood that the detected faces represent a same person;
generating a visual distribution of the extracted content, the visual distribution including groupings of the extracted content based, at least in part, upon the computed similarity confidence data;
displaying the visual distribution as a multi-dimensional layout of the faces such that the faces in the layout are displayed in multiple clusters of similar faces based on the groupings of the extracted content and such that distances between the faces in the layout are based on the computed similarity confidence data; and
receiving user input to tag the clusters with identifiers for the people depicted in the images, the identifiers of tagged clusters automatically propagating to the images associated with the groupings of the extracted content.

\* \* \* \* \*